United States Patent [19]

Sugiura et al.

[11] Patent Number: 4,729,884
[45] Date of Patent: Mar. 8, 1988

[54] PROCESS FOR THE PREPARATION OF A GRAPHITE INTERCALATION COMPOUND

[75] Inventors: Tsutomu Sugiura; Maki Sato; Kenichi Fujimoto, all of Kawasaki, Japan

[73] Assignees: Nippon Steel Corp.; Nippon Steel Chemical Co., Ltd., both of Japan

[21] Appl. No.: 893,259

[22] Filed: Aug. 5, 1986

[30] Foreign Application Priority Data

Aug. 17, 1985 [JP] Japan .................................. 60-180046

[51] Int. Cl.$^4$ .............................................. H01B 1/06
[52] U.S. Cl. ...................................... 423/448; 423/445; 423/449; 423/460; 252/502; 252/506; 252/508
[58] Field of Search ............... 423/445, 448, 449, 460; 252/502, 506, 508

[56] References Cited

U.S. PATENT DOCUMENTS

| | | | |
|---|---|---|---|
| 3,956,194 | 5/1976 | Armand | 252/506 |
| 4,560,409 | 12/1985 | Goldberger et al. | 252/506 |
| 4,565,649 | 1/1986 | Vogel | 252/506 |
| 4,604,276 | 8/1986 | Oblas et al. | 423/449 |
| 4,608,192 | 8/1986 | Su | 252/506 |

FOREIGN PATENT DOCUMENTS

| | | | |
|---|---|---|---|
| 2537272 | 3/1976 | Fed. Rep. of Germany | 252/506 |
| 2107296 | 4/1983 | United Kingdom | 423/448 |

OTHER PUBLICATIONS

Y. Iye et al, Phys. Rev. B, 25, 4583, 1982.
F. Vogel et al., Bull. Am. Phys. Soc., 21, 262, 1976.
Takahashi et al., Glossary of Lectures for the 11th Annual Meeting of the Carbon Society of Japan, p. 42, 1984.
S. Flandrois, Synth. Met., 3, 1, 1981.
E. Stumpp, Mat. Sci. Eng., 31, 53, 1977.

Primary Examiner—Gregory A. Heller
Assistant Examiner—Robert M. Kunemund
Attorney, Agent, or Firm—Parkhurst & Oliff

[57] ABSTRACT

In the production of a graphite intercalation compound in which the intercalant is a metal chloride, the reaction is carried out in the presence of a second metal chloride of a relatively low boiling point to effect a notable reduction in the reaction time. In the production of a metal chloride intercalation compound which normally requires an atmosphere of chlorine, the addition of the second metal chloride permits the reaction to proceed in the absence of chlorine gas.

1 Claim, No Drawings

PROCESS FOR THE PREPARATION OF A GRAPHITE INTERCALATION COMPOUND

BACKGROUND OF THE INVENTION

1. Field of the Invention

This invention relates to a method for the production of a graphite intercalation compound. More particularly, this invention relates to a method for the production of a graphite intercalation compound which, by effecting the reaction for the production in the presence of a second metal chloride besides the metal chloride destined to form the intercalant aimed at, notably shortens the time required for the synthesis of the graphite intercalation compound and permits the synthesis to be carried out effectively without using chloride.

2. Description of the Prior Art

The graphite intercalation compounds have been found to combine the chemical stability inherent in graphite and other properties with high degrees of electroconductivity proper to metals. The knowledge has encouraged numerous researches. These researches have unveiled the fact that graphite intercalation compounds have their nature governed by the kinds of intercalants inserted therein.

In the case of a graphite intercalation compound which has an alkali metal such as, for example, potassium as an intercalant, the graphite intercalation compound lacks stability in the air and yields to decomposition though it enjoys improved electroconductivity (Y. Iye et al., Phys. Rev. B, 25, 4583, 1982).

It has been reported that when an intercalant formed of antimony pentafluoride is used, the electroconductivity of the graphite intercalation compound using this intercalant is better than that of copper metal. In this case again, the graphite intercalation compound lacks stability in the air and, therefore, has much to be desired for the sake of practical applications (F. Vogel et al., Bull. Am. Phys. Soc., 21, 262, 1976).

The graphite intercalation compounds using metal chlorides as their intercalants possess such degrees of electroconductivity that fall short of that of copper metal but compare favorably with those of almost all metals and, that is more, enjoy stability in the air.

Particularly, when an intercalant of the cupric chloride is used, the graphite intercalation compound is stable not only in the air but also under water. The reaction for the intercalation of cupric chloride into graphite, however, proceeds so slowly that some tens of days are required for completion of the reaction (Takahashi et al., Glossary of Lectures for the 11th Annual Meeting of The Carbon Society of Japan, page 42, 1984). Owing to the slowness of the reaction, quantity use of the compound has proved virtually impracticable.

In the intercalation of nickel chloride into graphite, no graphite intercalation compound is obtained simply by heating graphite and nickel chloride intended as an intercalant for incorporation in the graphite layer under a vacuum. It has been known that in this case, the intercalation is obtained only when nickel chloride is sealed in under an atmosphere of chlorine and the graphite intercalation compound is not formed under a vacuum or under an atmosphere of any other gas than chlorine (S. Flandrois, Synth. Met., 3, 1, 1981).

For the production of a graphite intercalation compound using such a metal chloride as a substance for intercalation in the graphite layer, therefore, the presence of chlorine, a highly corrosive gas, in the reaction system is indispensable. Experimentally and practically it has been difficult to attain the synthesis easily.

It has been also known that in the intercalation of aluminum chloride in the graphite layer, the reaction time is considerably shorter when the sealing is made under an atmosphere of chlorine than when the sealing is made under a vacuum. Thus, the use of chlorine gas has been involved in the reaction system of this kind.

It has been further known that in the synthesis of graphite intercalation compounds using metal chlorides, when the reaction for this intercalation is carried out in the presence of aluminum chloride, etc. under an atmosphere of chlorine, the aluminum chloride, etc. forms a complex with the metal chloride intended for the intercalation and enhances the velocity of the reaction (E. Stumpp, Mat. Sci. Eng., 31, 53, 1977). This method however, poses problems that the reaction requires chlorine and the second metal chloride is added in such a large amount that it will survive in a large amount as a residue in the produced compound.

SUMMARY OF THE INVENTION

The inventors have continued a diligent study for the purpose of solving the problems and notably increasing the velocity of the reaction. They have consequently found that the velocity of the reaction can be heightened by allowing a second metal chloride of a low boiling point to be present in a minute amount in the reaction system and that the presence of the minute amount of the second metal chloride of a low boiling point enables the reaction for which the presence of chlorine gas has been found an indispensable requirement to proceed to completion in the absence of chlorine gas. The present invention has been perfected at the result.

An object of this invention is to provide a method for the production of a graphite intercalation compound using as an intercalant thereof a metal chloride such as, for example, ferric chloride, cupric chloride, nickel chloride, aluminum chloride, or cobalt chloride, which permits a marked reduction in the reaction time heretofore so protracted as to pose a serious problem.

Another object of this invention is to provide a method for the production of a graphite intercalation compound using a specific metal chloride such as, for example, nickel chloride capable of inducing successful synthesis of the compound only under an atmosphere of chlorine which method obviates the necessity for use of chlorine in the reaction.

DETAILED DESCRIPTION OF THE INVENTION

In the production of a graphite intercalation compound in which the intercalant is a metal chloride, this invention aims to provide a method which is characterized by allowing the reaction for the production to proceed in the presence, besides the metal chloride intended for the intercalation, of a second chloride having a relatively low boiling point and in the absence of chlorine gas.

To be specific, this invention, in the production of a graphite intercalation compound using as an intercalant thereof a metal chloride such as, for example, ferric chloride, cupric chloride, aluminum chloride, nickel chloride, cobalt chloride, manganese chloride, or chromium chloride, permits a notable reduction in the reaction time by adding a minute amount of a second metal chloride of a relatively low boiling point such as, for example, ferric chloride (boiling point, 317° C.) or aluminum chloride (sublimation point 183° C.), cupric chloride, or cobalt chloride and, in the production of a graphite intercalation compound using a specific metal chloride such as, for example, nickel chloride capable of inducing successful synthesis of the compound only under an atmosphere of chlorine, obviates necessity for use of chlorine by the use of a minute amount of the second metal chloride.

Use of just one second metal chloride is as effective in this invention as use of two or more second metal chloride in a mixed form. Preferred metal chlorides which have relatively low boiling points and are usable as said second metal chloride comprise those which have boiling points or sublimation points of not more than 320° C. as described above, and those which have higher vapor pressures at the reaction temperature than the vapor pressures that the intercalants have.

Now, the present invention will be described in detail below. The production of a graphite intercalation compound in accordance with this invention is attained by charging a reaction vessel with graphite, a metal chloride intended as an intercalant, and a minute amount of a second metal chloride as an additive, vacuumizing the reaction vessel, and sealing it tightly, and allowing the contens thereof to react. Any of the various kinds of graphite known to produce graphite intercalation compounds can be used as the graphite for the sake of the reaction. Powdery natural graphite, sheetlike natural graphite, sheetlike swelled graphite, graphite fibers, and man-made graphite are examples. The amount of the second metal chloride to be added is in the range of 0.1 to 2.0% by weight, preferably 0.3 to 2.0% by weight, based on the metal chloride intended as an intercalant. If the second metal chloride is added in an amount exceeding the upper limit of the aforementioned range, there is the possibility that the pressure inside the reaction vessel will rise so much as to jeopardize the safety of the reaction and the second metal chloride will mingle in a large amount in the product and render the control of characteristics such as, for example, thermal stability and electroconductivity difficult. If the amount of the second metal chloride to be added is less than the lower limit of the aforementioned range, the velocity of the reaction is not heightened so much as expected. The reaction vessel charged with the raw materials described above is heated to a temperature in the range of 200° C. to 700° C., though variable with the particular kind of metal chloride intended for intercalation, to induce reaction of the raw materials and give rise to the graphite intercalation compound aimed at.

In the present invention, the addition of a minute amount of a metal chloride other than the metal chloride intended for intercalation between graphite layers is recognized to bring about a notable increase in the velocity of the reaction. The exact mechanism responsible for the acceleration of the reaction remains yet to be elucidated. The accelerated reaction velocity may be logically explained by a postulate that when the added metal chloride of a relatively low boiling point such as, for example, ferric chloride or aluminum chloride is inserted into the graphite layers or when the chlorine generated in consequence of thermodynamic equilibrium is incorporated between the graphite layers in the initial stage of reaction, if confers electric charge upon the graphite layers and consequently activates the reaction for the intercalation of the metal chloride between the layers and that the added metal chloride partly forms a metal chloride complex and consequently increases the apparent gaseous partial pressure of the metal chloride intended for intercalation between graphite layers.

EXAMPLE 1

In synthesizing a graphite intercalation compound by using sheetlike natural graphite and cupric chloride as an intercalant for insertion between graphite layers, the reaction was carried out in the presence of ferric chloride added to the reaction system in an amount of about 1% by weight based on the cupric chloride. A reaction vessel was charged with the raw materials, vacuumized, then sealed tightly, and heated to induce reaction of the contents thereof at 480° C. Formation of the graphite intercalation compound was confirmed by measurement of X-ray diffraction. The results are shown in Table 1. For comparison, the reaction was carried out in the absence of ferric chloride. The results are also shown in the same table. It is noted from this table that the increased weight per g of the graphite existing at the end of the reaction was 0.32 g after 2 days and 2.10 g after 29 days respectively of reaction time in the reaction performed in the absence of ferric chloride, whereas it was 0.92 g after 2 days and 2.10 g after 5 days respectively of reaction time, indicating that the addition of ferric chloride brought about a notable increase in the reaction velocity.

TABLE 1

| Intercalant | Additive (ferric chloride) | Reaction time (days) | Increased weight (g) per g of graphite | |
|---|---|---|---|---|
| Cupric chloride | Yes | 2 | 0.92 | This invention |
| Cupric chloride | Yes | 5 | 2.1 | This invention |
| Cupric chloride | No | 2 | 0.32 | Comparative Experiment |
| Cupric chloride | No | 29 | 2.1 | Comparative Experiment |

EXAMPLE 2

In synthesizing a graphite intercalation compound by using sheetlike natural graphite and aluminum chloride as an intercalant for insertion between graphite layers, the reaction was carried out in the presence of ferric chloride added to the reaction system in an amount of about 1% by weight based on the aluminum chloride. The reaction temperature was 255° C. and the reaction time was 6 hours. Confirmation of the formation of the graphite intercalation compound and the reaction were carried out by following the procedure of Example 1. In the reaction performed in the presence of ferric chloride, an increased weight of 2.10 g per g of graphite was recognized, whereas the amount of aluminum chloride intercalated was only 0.26 g per g of graphite in the reaction performed in the absence of ferric chloride.

EXAMPLE 3

In synthesizing a graphite intercalation compound by using sheetlike natural graphite and cupric chloride as an intercalant for insertion between graphite layers, the reaction was carried out in the presence of aluminum chloride added to the reaction system in an amount of about 1% by weight based on the cupric chloride. The reaction temperature was 480° C. and the reaction time was 3 days. Confirmation of the formation of the graphite intercalation compound and the reaction were carried out by following the procedure of Example 1. In the reaction performed in the presence of aluminum chloride, an increased weight of 1.10 g of per g of graphite was recognized. In contrast, in the reaction performed under the same conditions except for the absence of aluminum chloride, only 0.46 g of cupric chloride was intercalated per g of graphite.

EXAMPLE 4

In synthesizing a graphite intercalation compound by using powdery natural graphite and nickel chloride as an intercalant for insertion between graphite layers, the reaction was carried out in the presence of ferric chloride added to the reaction system in an amount of about 1% by weight based on the nickel chloride. The reaction temperature was 600° C. and the reaction time was 3 days. Confirmation of the formation of the graphite intercalation compound and the reaction were carried out by following the procedure of Example 1. In the reaction performed in the presence of ferric chloride, an increased weight of 0.05 g per g of graphite was recognized. In contrast in the reaction performed under the same conditions except for the absence of ferric chloride, absolutely no increased weight was recognized. It has been known that in the reaction system for intercalation of nickel chloride between graphite layers, the desired graphite intercalation compound is formed only under an atmosphere of chlorine gas. The inventors have found that, by using ferric chloride as an additive, the graphite intercalation compound of nickel chloride can be synthesized even in the absence of chlorine gas.

EXAMPLE 5

In synthesizing a graphite intercalation compound by using powdery natural graphite and cupric chloride as an intercalant for insertion between graphite layers, the reaction was carried out in the presence of cobalt chloride added to the reaction system in an amount of about 1% by weight based on the cupric chloride. The reaction temperature was 480° C. and the reaction time was 24 hours. Confirmation of the formation of the graphite intercalation compound and the reaction were carried out by following the procedure of Example 1. In the reaction performed in the presence of cobalt chloride, an increased weitht of 0.80 g per g of graphite was recognized, whereas the amount of cupric chloride intercalated was only 0.42 g per g of graphite in the reaction performed in the absence of cobalt chloride.

This invention, in the production of a graphite intercalatin compound using a metal chloride as an intercalant, provides a method of production which permits a notable reduction in the reaction time heretofore protracted so much as to raise a problem. Further, in the production of a graphite intercalation compound using as an intercalant thereof a specific metal chloride capable of inducing the synthesis of the compound only under an atmosphere of chlorine, this invention obviates the necessity for use of chlorine gas owing to the addition of a second metal chloride. Thus, this invention decreases the heating time required during the course of the reaction and brings about an effect of saving energy consumption. Since it permits synthesis of the graphite intercalation compound without use of chlorine, a highly corrosive gas, it contributes to improving the work environment.

Thus obtained graphite intercalation compound has light weight, good electroconductivity proper to metals, and highly stability in air; and has many usefull uses of such as a light leading wire, EMI shield materials, a electroconductive paint, packings, compound, etc..

What is claimed is:

1. A process for preparing a graphite intercalation compound having a first metal chloride as an intercalant thereof, said process comprising:

reacting graphite and said first metal chloride in the presence of a second metal chloride and in the absence of chlorine gas, said first metal chloride being selected from the group consisting of cupric chloride, aluminum chloride, nickel chloride, cobalt chloride, manganese chloride and chromium chloride, and said second metal chloride being selected from the group consisting of ferric chloride, aluminum chloride, cupric chloride, and cobalt chloride, wherein said second metal chloride is different from said first metal chloride and is present in an amount of 0.1% to 2.0% by weight based on said first metal chloride.

* * * * *